E. F. HORSTMANN.
THIRD RAIL CLEANER.
APPLICATION FILED NOV. 3, 1913.
1,112,616.
Patented Oct. 6, 1914.
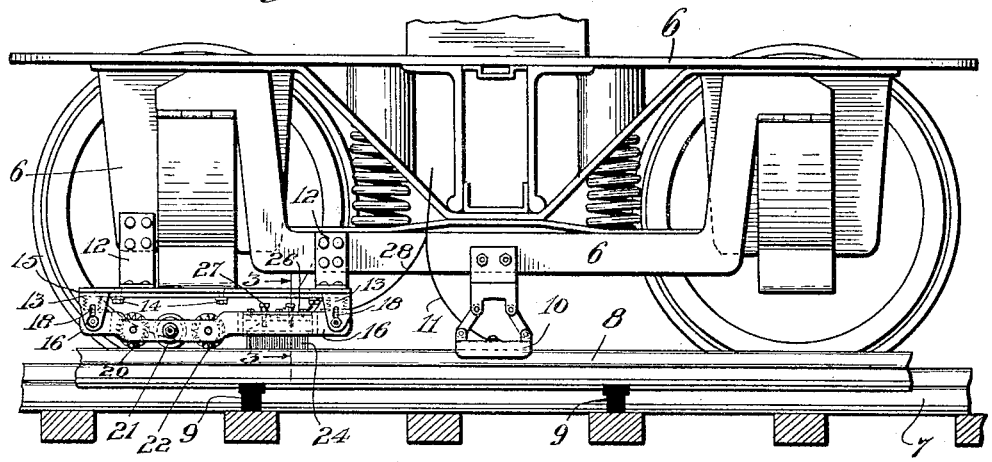
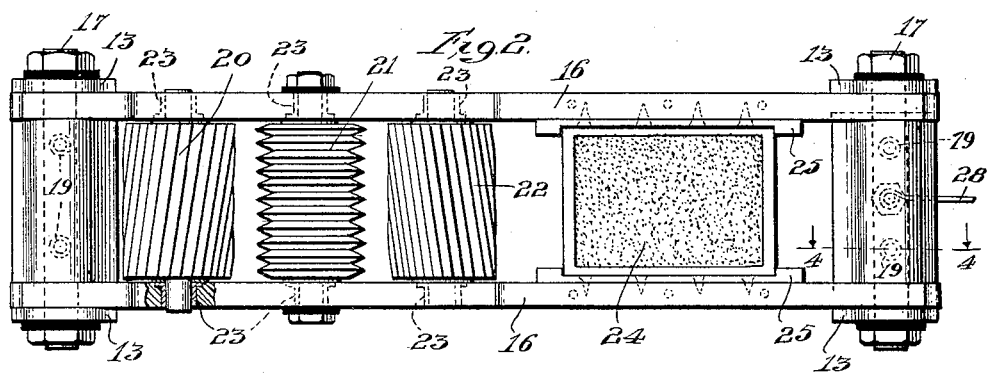
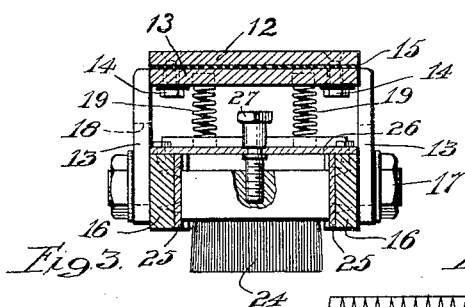
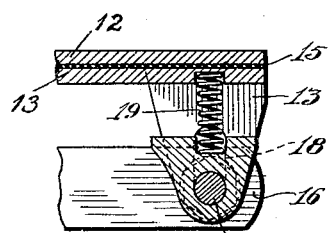
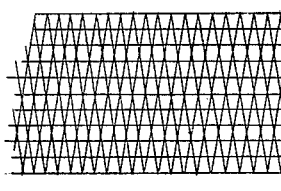
Witnesses:
H. S. Bull.
T. Colson.
Inventor
Edward F. Horstmann,
By Joshua R. H. Potts
His Attorney.

UNITED STATES PATENT OFFICE.

EDWARD FRED HORSTMANN, OF AURORA, ILLINOIS.

THIRD-RAIL CLEANER.

1,112,616.  Specification of Letters Patent.  Patented Oct. 6, 1914.

Application filed November 3, 1913. Serial No. 798,898.

*To all whom it may concern:*

Be it known that I, EDWARD F. HORSTMANN, a citizen of the United States, and a resident of the city of Aurora, county of Kane, and State of Illinois, have invented certain new and useful Improvements in Third-Rail Cleaners, of which the following is a specification.

My invention relates to cleaners for third rails of electrical railways and more particularly to such devices which are adapted to remove ice and sleet from the third rails of such railways.

The object of this improvement is to provide a simple and effective device of this character.

Other objects will appear hereinafter.

The invention consists in the combinations and arrangements of parts hereinafter described and claimed.

The invention will be best understood by reference to the accompanying drawing forming a part of this specification, and in which, Figure 1 is an elevation of a car truck on a track and equipped with a track cleaner embodying my invention, Fig. 2 is an enlarged bottom view of the track cleaner, Fig. 3 is a section of the same taken on the line 3—3 in Fig. 1, Fig. 4 is a section taken on the line 4—4 in Fig. 2, and Fig. 5 is a diagrammatic view showing the lines cut by the cutter wheels after all of them have passed over a surface.

Referring to the drawings, a car truck 6 of ordinary construction is mounted on a conventional track 7. The track 7 is provided with a third rail 8 mounted on insulators 9. The truck 6 carries a conductor shoe 10 of ordinary construction and a conductor wire 11 leads from the conductor shoe 10 to the electrical circuit of the car, not shown. At the forward end of the truck 6 is an ice or sleet remover which forms the subject of this invention.

The preferred form of construction of my device comprises a bracket 12 secured to the truck 6, and secured to the lower side of the bracket 12 is a frame comprising a member 13 which is secured to the bracket 12 by means of bolts 14 and insulated therefrom by means of an insulating strip 15. The lower portion of the frame section 16 is provided with laterally extending bolts 17 which engage slots 18 in the frame portion 13. Between the portions 13 and 16 of said frame are provided compression springs 19 adapted to normally press the frame section 16 downwardly toward the third rail 8.

At one end of the frame section 16 is mounted three cutter wheels 20, 21 and 22, each of which is journaled in a bearing bushing 23 of a suitable bearing material and such bearing bushing is secured in the frame section 16. The teeth on the wheel 20 are spiral in form and the teeth on the wheel 22 are also of spiral form but disposed in a different direction from the teeth on the wheel 20, as clearly indicated in Fig. 2. The teeth on the wheel 21 are circular and extend around said wheel. The cutters on said wheels are disposed in such manners as to cut lines as represented by the diagrammatic view in Fig. 5 upon passing over a sheet of ice, or other substance. Cutting the ice or other substance into small pieces, such as indicated between the lines in Fig. 5, effectively breaks the small particles of ice loose from the third rail, making it easy for a brush to remove the same from the rail. Immediately following said cutter wheels is a brush 24. The brush 24 is mounted for vertical movement in the guides 25, the latter being secured to the frame section 16, substantially as indicated in Figs. 2 and 3. Across the upper side of the brush 24 and secured to the guides 25 are plates 26. In the plates 26 are mounted screws 27 adapted to rotate in said plates but locked against longitudinal movement therein. The lower ends of the screws 27 are threaded in the brush 24, so that, upon turning said screws, the brush 24 will be moved vertically in its guide. The purpose of adjusting the brush vertically is to provide a means for adjusting the brush downwardly as the bottom of the brush wears off through friction with the rail 8. The electrical conductor 28 is connected with one end of the frame portion 16 and connected with conductor 11 and adapted to assist in making an electrical connection between the electrical circuit in the car and the third rail 8.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

A rail cleaner comprising a spring pressed frame; three spaced parallel cutter wheels mounted in said frame, the cutters on one wheel being disposed spirally thereon, the cutters on the second wheel being circular and disposed around said second mentioned wheel, and the cutters on the third wheel being spiral and in a different direction from those on said first mentioned wheel; vertical guides in said frame; a brush mounted in said vertical guides; and means for adjusting said brush in said guide, substantially as described.

In testimony whereof I have signed my name to this specification in the presence of two subscribing witnesses.

EDWARD FRED HORSTMANN.

Witnesses:
JOHN L. BALFOUR,
ELMER L. SITH.

---

Copies of this patent may be obtained for five cents each, by addressing the "Commissioner of Patents, Washington, D. C."